AMPLIFYING DEVICE

Filed March 31, 1959

INVENTORS
CARL GUSTAF SÖDERBAUM
INGEMAR MITNITZKY
BY Hane and Nydick
ATTORNEYS

United States Patent Office 3,022,379

Patented Feb. 20, 1962

3,022,379

AMPLIFYING DEVICE

Carl Gustaf Söderbaum, Stockholm Sv, and Ingemar Mitnitzky, Stockholm-Bandhagen, Sweden, assignors to Telefonaktiebolaget L M Ericsson, Stockholm, Sweden, a corporation of Sweden Filed Mar. 31, 1959, Ser. No. 803,116
Claims priority, application Sweden Apr. 28, 1958
1 Claim. (Cl. 179—1)

The present invention refers to an amplifying device for a loudspeaking telephone of the kind which comprises a first amplifier for amplyfying currents developed in a microphone to provide output currents for a two-wire line, a second amplifier for amplifying said currents intended for a loud speaker and coming from the two-wire line, a first circuit actuating the amplification of said output currents and attenuating same during the rest state of the first amplifier, and a second circuit actuating the amplification of said microphone currents and attenuating same during the rest state of the amplifier.

The object of the invention is to provide an amplifying device of the kind mentioned above, which amplifying device, compared with prior-known similar devices, has very short switching times for switching the amplifying device, respectively, from the rest state to the sending state and from the sending state to the receiving state, and vice versa without any risk of distortion or instability in the device. Thus the beginning and end words of a speech are not suppressed.

An amplifying device according to the invention is characterized in that for each of said two attenuation circuits there is a transistor device actuating the attenuation in the respective attenuation circuit, which transistor device on its input side has a first condenser arranged to be recharged by a current coming, respectively, from said first amplifier, and on its output side has a second condenser arranged to be recharged during the rest state of the second amplifier, but to be quickly discharged over said transistor, which transistor is arranged to feed in its conductive state a regulating current actuating the attenuation in the respective attenuation circuit, when the transistor pertaining to the transistor device is conductive owing to the recharged state of said first condenser.

Figure 1:
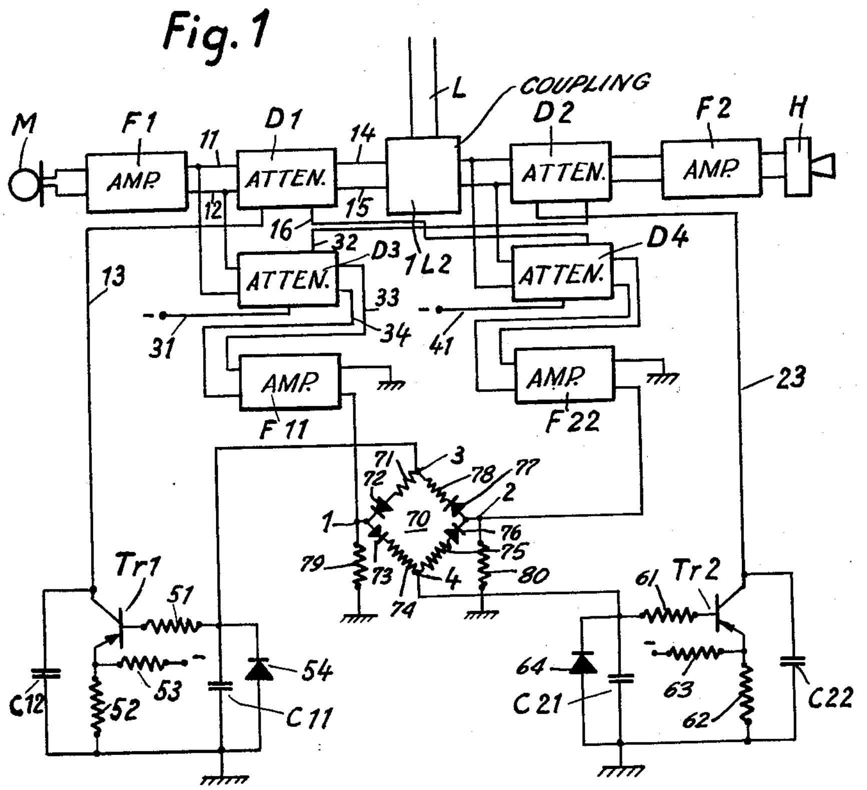
Figure 2:
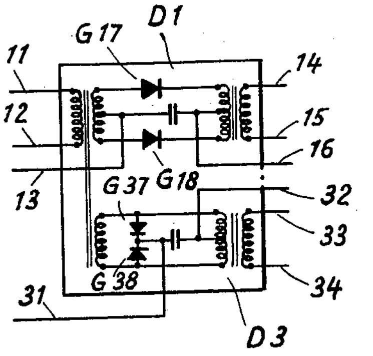

The invention will be understood more fully from the detailed description that follows, when taken together with the attached drawing, wherein FIG. 1 shows schematically an amplifying device according to the invention, and FIG. 2 shows in detail two attenuation circuits pertaining to the amplifying device according to FIG. 1.

Referring now to the drawing, currents generated in a mocrophone M in response to speech are amplified in a first amplifier F1 and are supplied to a two-wire line L over lines 11—12, an attenuation circuit D1, which offers small attenuation during the sending state of the amplifier device, lines 14—15, and a four-wire-two-wire circuit 1L2. The attenuation circuit D1, shown in FIG. 2, comprises on one hand two rectifiers G17 and G18 connected against each other and separated by one secondary winding of the input transformer and the primary winding of the output transformer, and on the other hand a condenser connecting the middle points of said two windings. The attenuation circuit D1 is during the rest state of the amplifying device attenuating and during its receiving state strongly attenuating, but during the sending state of the amplifying device it is slightly attenuating owing to a regulating current fed to the attenuation circuit over a line 13 from a transistor Tr1 of the transistor device C11–Tr1–C12.

To the output side of the amplifier F1, a third attenuation circuit D3 is also connected, which during the rest state of the amplifier device or the sending state offers small attenuation. The attenuation circuit D3 is shown also in FIG. 2 and comprises on one hand two rectifiers G37 and G38 connected against each other and connected at the ends thereof across another secondary winding of the input transformer, and on the other hand a condenser connecting the common point of the rectifiers and the middle point of the primary winding of another output transformer. The output of the attenuation circuit D3 is taken from the secondary winding of said output transformer over lines 33—34, which are connected to a control amplifier F11. The output of amplifier F11 is connected to ground through a resistor 79 and to a point 1 in a rectifying, four-armed control operating circuit 70, each arm of which has a rectifier 72, 73, 76, or 77 and a resistance 71, 74, 75 or 78, respectively, connected in such a way that current flows in the operating circuit in a certain direction (in a counter clock-wise direction). As the rectifiers are shown in the drawing, the point 3 will have a negative potential relative to ground when the control amplifier F11 is conducting, while at the same time the point 4 will have a positive potential.

The transistor device C11–Tr1–C12 comprises on one hand a first condenser C11, which is connected through the resistances 51 and 52 to the base and emitter of the transistor Tr1, and on the other hand a voltage limiting rectifier 54, which is connected in parallel therewith, and further the transistor Tr1 and a second condenser C12, which is connected through the resistance 52 to the emitter and collector of the transistor Tr1. The base of the transistor Tr1 is connected through the resistance 51 to the point 3, its emitter is connected through a resistance 53 to a negative potential, and its collector is connected over the line 13 to the middle point on the secondary winding of the input transformer in the attenuation circuit D1.

Microphone currents coming from the two-wire line L are conducted over the circuit 1L2, a second attenuation circuit D2 and a second amplifier F2 to a loud speaker H. The attenuation circuit D2 is indentical with the attenuation circuit D1. To the input side of the attenuation circuit D2, a fourth attentuation circuit D4 is connected, which is identical with the attenutation circuit D3. The output side of the attenuation circuit D4 is connected to a control amplifier F22, the output side of which is connected to ground through a resistor 80 and to a point 2 in the control operating circuit 70. As this control operating circuit is arranged, the point 4 will have a negative potential relatively to ground when the control amplifier F22 is conducting, while at the same time the point 3 will have a positive potential.

During the receiving state of the amplifying device the attenuation circuit D2 offers small attenuation owing to a regulating current fed to the attenuation circuit over a line 23 from a transistor device C21–Tr2–C22, which is identical with the transistor device C11–Tr1–C12.

The transistor device C21–Tr2–C22 comprises on one hand a first condenser C21, which is connected through resistances 61 and 62 to the base and emitter of a transistor Tr2, and on the other hand a voltage-limiting rectifier 64, which is connected in parallel to the condenser C21, and further the transistor Tr2 and a second condenser C22, which is connected through a resistance 62 to the emitter and collector of the transistor Tr2. The base of the transistor is connected to the point 4, its emitter is connected to a negative potential and its collector is connected over the line 23 to the middle point of the secondary winding of the input transformer in the attenuation circuit D2.

The first attenuation circuit D1 and the fourth attenuation circuit D4 are arranged to be traversed by the same regulating current, when the third attenuation circuit D3 passes amplified microphone currents. This occurs by connecting the regulating current coming over the line 13, after passage through the attenuation circuit D1, through a line 16 to the attenuation circuit D4, from which attenuation circuit it is connected to the negative side of a voltage source over a line 41. The lines 16 and 41 mentioned in connection with the attenuation circuit D4 correspond in FIG. 2 to the lines 32 and 31 for the attenuation circuit D3. The line 16 is thus connected to the middle point of the primary winding of the output transformer in the attenuation circuit D4, while the line 41 is connected to the common point of the rectifiers G37 and G38.

The second attenuation circuit D2 and the third attenuation circuit D3 are arranged to be traversed by the same regulating current in the same manner, when the fourth attenuation circuit D4 passes current developed coming from said microphone currents. This occurs by connecting the regulating current coming over the line 23, after passage through the attenuation circuit D2, through the line 32 to the attenuation circuit D3, from which attenuation circuit it is connected to the negative side of a voltage source over the line 31.

By including in both the third attenuation circuit D3 and the fourth attenuation circuit D4 a shunt element actuating the attenuation in the respective attenuation circuit, namely the combination of G37–G38, the attenuation in the first and second attenuation circuits D1 and D2, respectively, which are connected in parallel on the input side to the third and fourth attenuation circuits, will be greater to the same extent that the impedance of the shunt element will be smaller in D3 and D4, respectively. That is, the first and second attenuation circuits, respectively, have a higher attenuation than normally during the rest state of the amplifying device when the demands for high attenuation are greatest. In the rest state the attenuation is about 25 db between the lines 11—12 and the lines 14—15. This attenuation is caused by D1 and the attenuating influence of D3 on D1. The current which in the rest state passes through the line 13, is dependent upon temperature. As temperature increases this current increases, and the attenuation in D1 decreases, but at the same time the attenuating influence of D3 on D1 is greater, and with suitable dimensioning of components, the attenuation between lines 11—12 and lines 14—15 is made constant within a certain temperature interval.

On the receiving side the conditions are the same for D2 and D4 as for D1 and D3 in the rest state. The current in line 23 is about the same as in line 13.

In the sending state T*r*1 is conductive and the attenuation in D1 disappears. The attenuating influence of D3 on D1 disappears also, as the base of T*r*2 is so positive that the rest state current in line 23 decreases to practically I*ko* (that is, the leakage current between the base and the collector with an open emitter). This decrease of the current in line 23 causes the attenuation in D2 to be greater. The increase of the current in line 13 causes D4 to be strongly attenuating at the same time as the attenuating influence of D4 on D2 decreases. Thus, the attenuation in the receiving channel increases and the increase can with suitable component dimensioning be made, for instance, 25 db, that is, as great as the decrease in the sending channel.

When current flows in the microphone M, the condenser C11 is thus recharged very quickly to a negative voltage sufficient to make the transistor T*r*1 conduct. The condenser C12, recharged before the conductive state of the transistor T*r*1, is discharged very quickly through the transistor T*r*1 and the resistance 52, but somewhat earlier than the condenser C12 is fully discharged; thus, the regulating current in line 13 from the transistor T*r*1 has such a magnitude that the attenuation of the attenuation circuit D1 is reduced to a value sufficiently low for passing the output currents from the microphone. When current developed in the microphone M ceases, the condenser C11 is recharged very quickly, but the condenser C12 is recharged relatively slowly over the attenuation circuits D1 and D4, dependent on the D.C. resistance increasing the reducing regulating current at the diodes pertaining to the attenuation circuits. Thereby, a very short control time is obtained when changing from the rest state to the sending state without any risk of change of the connection at the intervals between words and sentences, which arise when a person speaks in a natural way. In a corresponding way the condenser C21 is very quickly recharged for microphone currents (intended for the loud speaker H), while the condenser C22 is discharged very quickly over the transistor T*r*2 and is recharged slowly over the attenuation circuits D2 and D3, dependent on the D.C. resistance increasing the reducing regulating current of the diodes pertaining to the attenuation circuits.

We claim:

An amplifying arrangement for use in a telephone installation, including a loud speaking telephone instrument having a microphone and a loud speaker connected to a two-wire line for respectively sending and receiving sound currents, said amplifying arrangement comprising, in combination, a first amplifier connected to said two-wire line for amplifying sound currents sent by the microphone, a second amplifier connected to said two-wire line for amplifying sound currents received by said loud speaker, a first attenuating network included in the connection between the microphone and the two-wire line, said attenuating network being substantially non-attenuating during the sending of sound currents by the microphone and substantially attenuating when said first amplifier is inactive, a second attenuating network included in the connection between the loud speaker and the two-wire line, said second attenuating network being substantially non-attenuating during the reception of sound currents by the loud speaker and substantially attenuating when the second amplifier is inactive, each of said attenuating networks including control means for controlling the attenuation thereby, each of said control means including a transistor, a first capacitor and a second capacitor connected in a transistor network, the first capacitor of each transistor network being connected to the input and the second capacitor of each transistor to the output of the respective transistor network, the first capacitor associated with the first attenuating network being charged by sound currents sent by the microphone and the first capacitor associated with the second attenuating network being charged by the sound currents received by the loud speaker, the second capacitor of each transistor network being charged during the inactive condition of the respective amplifiers and abruptly discharged when the transistor of the respective networks are conductive, each of said transistors being rendered conductive by the charging of the respective first capacitors and supplying when conductive a control current reducing the attenuation of the respective attenuating networks.

References Cited in the file of this patent

UNITED STATES PATENTS 2,702,319 Ryall ---------------- Feb. 15, 1955